United States Patent [19]
Chambers et al.

[11] Patent Number: 5,393,327
[45] Date of Patent: Feb. 28, 1995

[54] CARTRIDGE FILTER AND METHOD

[75] Inventors: John E. Chambers; David C. Brenner, both of Greenville, S.C.

[73] Assignee: Thermo-Kinetics Industries, Inc., Greenville, S.C.

[21] Appl. No.: 232,342

[22] Filed: Apr. 22, 1994

Related U.S. Application Data

[63] Continuation of Ser. No. 53,718, Apr. 27, 1993, abandoned.

[51] Int. Cl.$^6$ .............................................. B01D 46/00
[52] U.S. Cl. ......................................... 95/273; 55/302; 55/498; 55/521; 95/280
[58] Field of Search ................. 55/302, 490, 498, 510, 55/521; 95/279, 280, 273

[56]  References Cited
U.S. PATENT DOCUMENTS

| | | | |
|---|---|---|---|
| 4,209,310 | 6/1980 | Berkhoel | 55/510 |
| 4,278,454 | 7/1981 | Nemesi | 55/302 |
| 4,443,237 | 4/1984 | Ulurstad | 55/302 X |
| 4,504,288 | 3/1985 | Kreft | 55/302 |
| 4,836,834 | 6/1989 | Steele | 95/279 |
| 5,062,867 | 11/1991 | Klimczak | 95/280 |
| 5,062,873 | 11/1991 | Karlsson | 55/302 |
| 5,308,369 | 5/1994 | Morton et al. | 55/302 |

Primary Examiner—Charles S. Bushey
Attorney, Agent, or Firm—Ralph Bailey

[57]  ABSTRACT

An air filter cartridge receives air flow through a side filter media (A) for discharge through an orifice plate (B) carried at an air exit end opposite an opening in a wall, wherein a bellmouth air entrance member (C) within the air filter cartridge receives air flow from the filter media (A) and directs same to an evase (D) for reception thereby through an exit opening in the orifice plate for discharge through the exit opening in the wall.

18 Claims, 4 Drawing Sheets

CARTRIDGE FILTER AND METHOD

This application is a continuation of application Ser. No. 08/053,718, filed Apr. 27, 1993, now abandoned.

BACKGROUND OF THE INVENTION

This invention relates to cartridge filters having a novel exit structure for reducing the pressure drop across the filter and to an improved method for filtering air or other fluids utilizing a cartridge filter.

This invention is especially useful in connection with an air filter and the like such as illustrated in U.S. Pat. No. 4,955,996 having an air filter cartridge utilizing pleated paper having a cylindrical configuration as a filter medium. Such filters have proved to be exceedingly effective in removing dust and the like and in filtering out chromate primer dust such as is removed in the mechanical stripping of commercial and military aircraft. Such filters having circular cross section are supplied by several suppliers including Dustex Corporation of Charlotte, N.C. Problems with utilizing such filter cartridges where air enters through the sides of the filter which are preferably elongated or at least arranged to present a large filter surface area involves relatively high pressure drops across the filter. The side entrance of fluid is important in such devices because of their greater capacity over those having an entrance end covered with filter material. It has been found that by utilizing apparatus and method in accordance with the present invention, a pressure drop may be reduced substantially as much as from one-fifth to one-tenth of the total former pressure drop. It has been found that the open end or orifice plate of such filter cartridges, having a circular exit opening represents approximately 90% of the pressure drop of the total assembled filter so enhanced flow through the end plate gives the most potential for improvement and pressure drop reduction.

Cartridge filters are utilized invariably with a wall or other barrier to separate the positive pressure area from the negative pressure area adjacent the open end plate.

It is contemplated that bellmouth elements such as are often utilized at the entrance end of fan housings or other air handling devices and ducts are utilized according to the present invention for collecting air delivered through side filter media for passing same to the opening in the orifice plate. Such a device may be used alone in combination or with an evase. An evase may also be used alone in the combination with the cartridge filter at the exit end. An evase of the type contemplated herein is often used at the exit end of fan housings and the housings of other components or ducts for the purpose of reducing the pressure drop at the exit end.

SUMMARY OF THE INVENTION

Accordingly, it is an important object of the present invention to provide a cartridge filter having a pressure drop which has been reduced far beyond that which would have been expected through the addition to the filter cartridge combination of either the bellmouth or evase alone or together in the combination. The bellmouth and evase when used together produce an even greater effect in reducing pressure drop than the sum of the effects attained employing one or the other of the components.

Another important object of the invention is to provide an improved air filter for handling dust and the like such as occurs in the cleaning of airplanes as by stripping with glass beads or in a filter chamber or other environment wherein the use of cartridge filters is desirable. Many other applications include filters for gas turbines and filters for use in automotive painting.

Still another important object of the invention is the provision of a filter cartridge utilizing a bellmouth entrance opening at the inside of the open end of the orifice plate to reduce the pressure drop at the exit end of the filter by a far greater amount than would have been anticipated.

Another important object of the invention is the provision of a cartridge filter having an orifice exit plate and an opening provided with an evase.

Yet another important object of the invention is the provision of an improved cartridge filter utilizing the orifice plate at the exit end of the filter, a combination of bellmouth entrance components discharging air collected from the sides of the filter and delivering same to an entrance end of a evase adjacent the orifice plate for greatly reducing the pressure drop across the filter to an extent which exceeds the pressure drop as would result from the sum of that which would result from use of individual elements.

It has been found, for example, in applications where a 120 HP motor has been required to produce the desired air flow that it is possible utilizing the bellmouth and evase in the combination to reduce the size of the motor to 20 HP for the same purpose so great is the reduction in the pressure drop.

While the present invention will be described in terms of an air filter cartridge utilizing a cylindrical configuration of pleated paper, it is to be understood that a filter cartridge suitable for use in any fluid in any liquids having side delivery of air which is expelled through an orifice plate in the exit end may be advantageously utilized in the combination of the invention. The same results could be predicted if these components were used in combinations with filters of other shapes and configurations other than cartridge filters.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate an air filter having an exit end positioned opposite an opening in a wall. A cartridge includes an elongated support structure surrounded by filter media A wherein air enters laterally through sides of the filter media. An arcuate orifice plate B is carried at an air exit end of the cartridge having an exit opening for the air therein. A bellmouth air entrance member C is carried within said cartridge having an exit end connected to the cartridge opposite the exit opening of the orifice plate. An evase D has an entrance end connected to the cartridge opposite said exit opening of the orifice plate. The exit end of the bellmouth and the entrance end of the evase are in juxtaposition so that the evase receives air collected by the bellmouth directly from the exit end and discharges same from the cartridge through the evase.

Thus, the air pressure drop across the air filter is minimized. Preferably the cartridge, orifice plate, bellmouth and evase are circular in cross-section, and an end opposite the air exit end is closed or imperforate. The method contemplates passing an air flow into the cartridge and thence through the bellmouth and evase for reducing the pressure drop across the filter.

Figure 1:
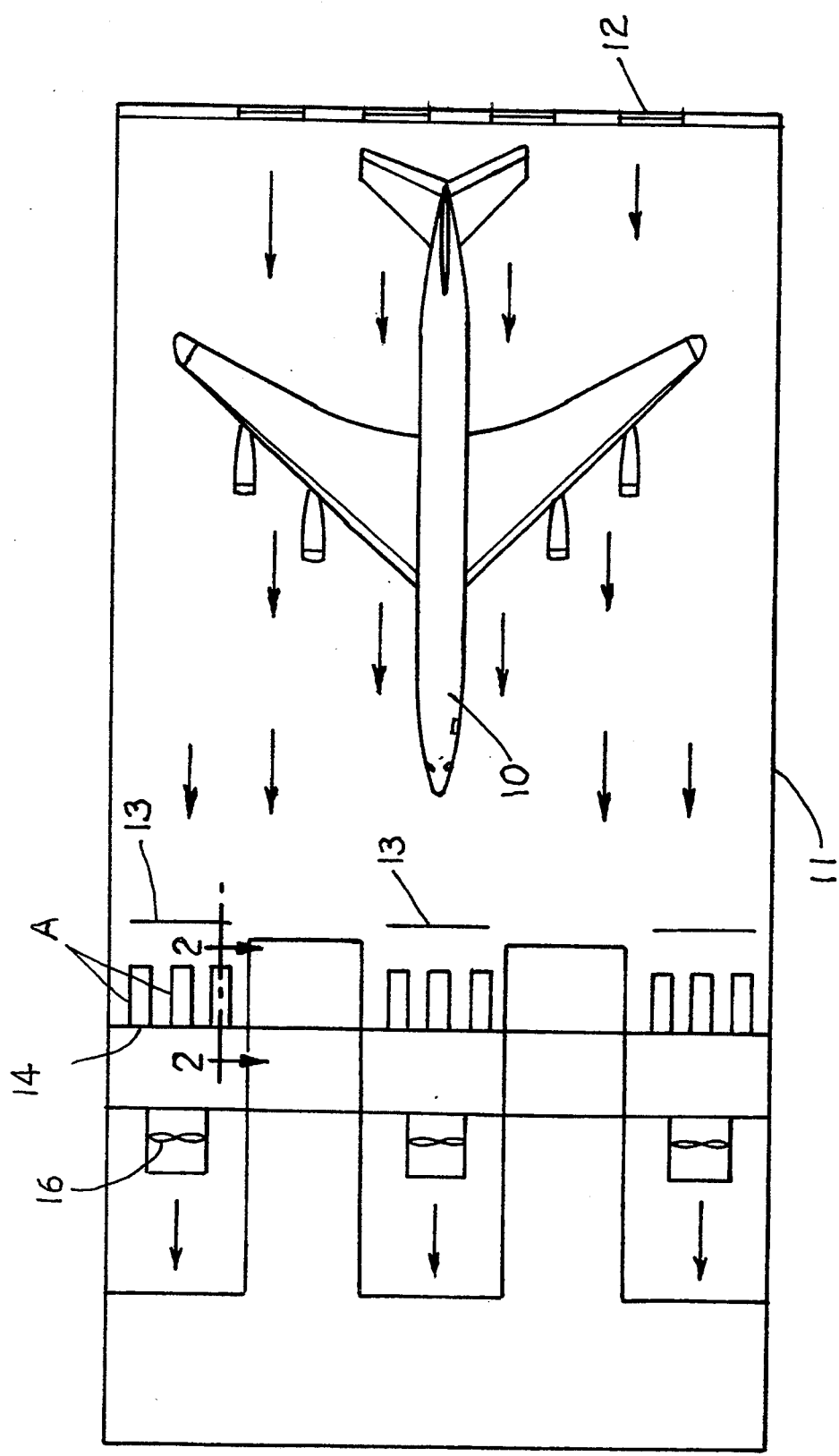
FIG. 1 is a schematic top plan view of a hanger and air handling apparatus for the mechanical stripping of an airplane as by blasting with fine particulate material.

Referring more particularly to FIG. 1, a schematic top plan view illustrates an airplane 10 positioned in a hanger 11 for carrying out a bead blasting operation. The hanger 11 has air entering through the louvers 12 located above the hanger doors, not shown. The air flow passes over the surfaces of the airplane during the stripping operation which releases dust particles which are carcinogenic and which must be removed from the air stream. The air flow containing particulate material, not already picked up at the point of Origin as the spraying takes place during stripping, travels toward the filter cartridges A. Dust shields are illustrated at 13. The filter cartridges A are illustrated as being contained within a wall 14 and a fan 16 producing a suction across the filter or partition 14 which separates the high pressure areas from the low pressure areas inducing air flow through the filter for suitable discharge from the hangers.

Figure 2:
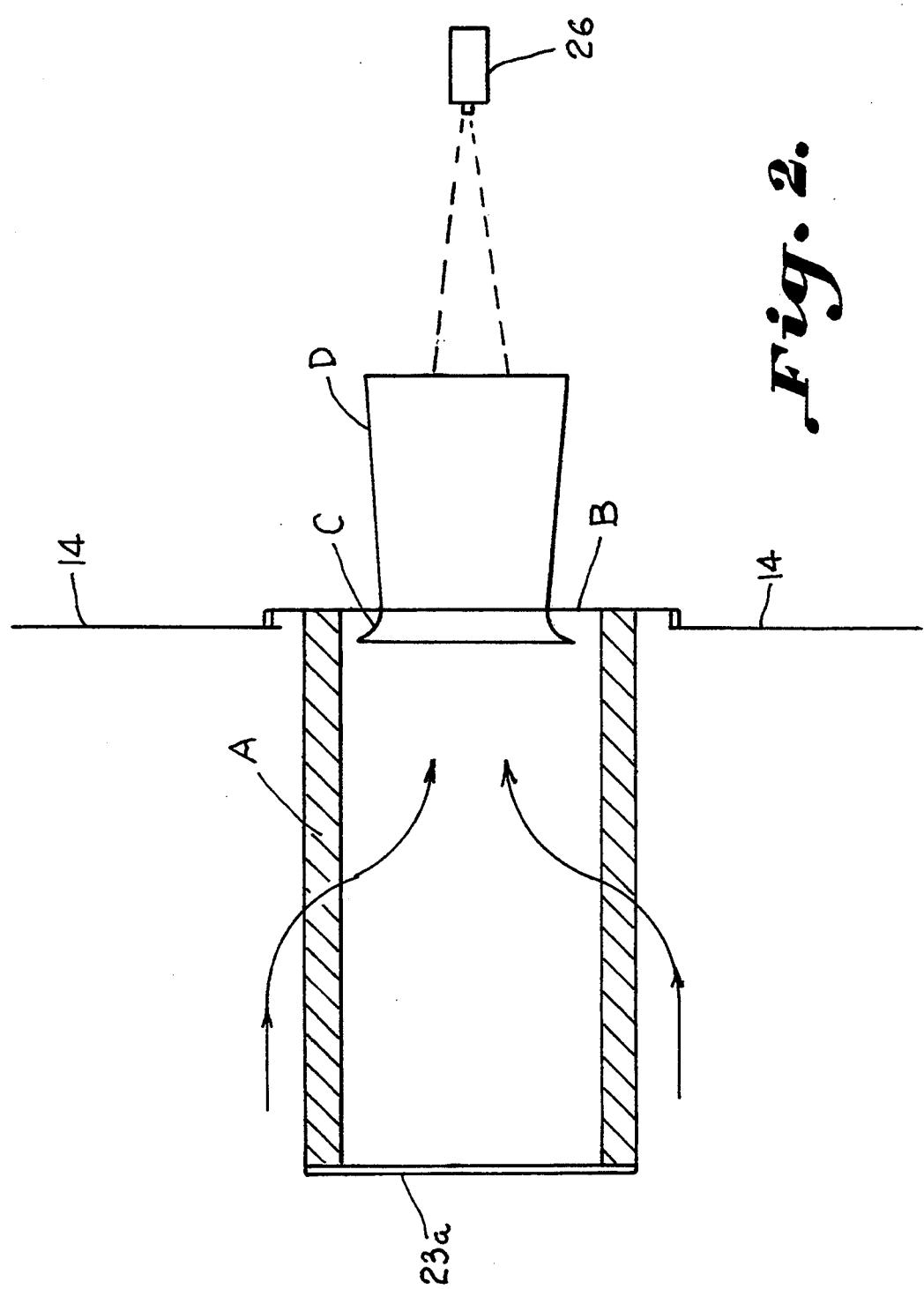
FIG. 2 is a schematic sectional elevation taken on the line 2—2 in FIG. 1.
Figure 3:
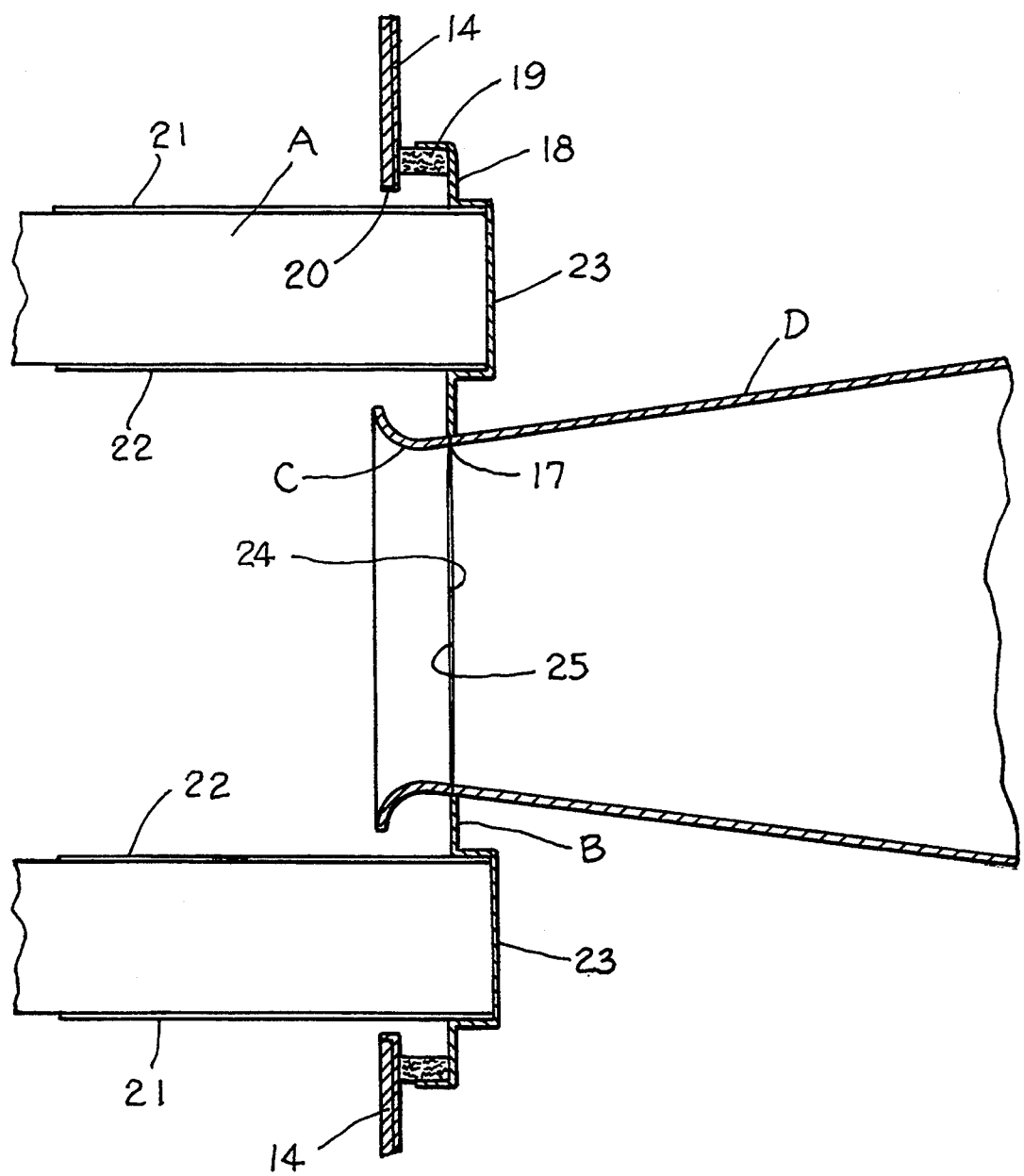
FIG. 3 is an enlarged sectional elevation of the exit end of the filter cartridge illustrated in FIG. 2 showing the mounting of the filter formed by the combination including the filter cartridge, bellmouth and evase.
Figure 4:
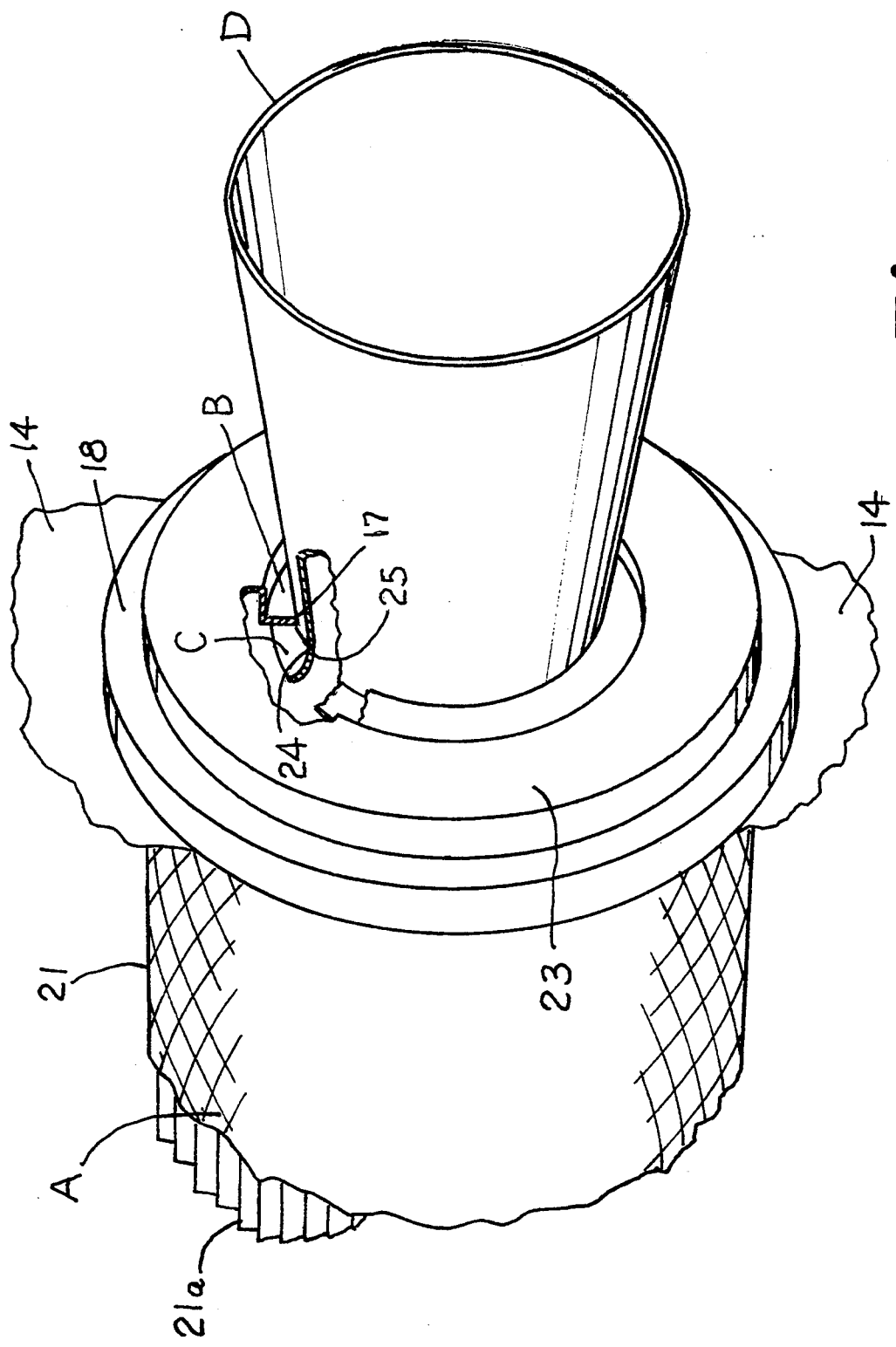
FIG. 4 is a perspective view looking down toward the front left hand side of FIG. 3 showing the cartridge, orifice plates filter media, bellmouth, exit orifice and evase as being of circular cross section with these elements in axial alignment.

Referring more particularly to FIGS. 2 and 3, it will be observed that the wall 14 has an opening 20 which receives the arcuate filter cartridges A. The orifice plate B has a circular opening 17 and is integrally connected to a flange 18 which carries a sealing gasket 19 for positioning the orifice plate B in sealing relation within the opening 20 in the filter wall 14. The arcuate filter media 21a is preferably in the form of longitudinally pleated filter paper and is carried in arcuate relation within concentric cylinders or shells constructed as of expanded metal as at 21 and 22 respectively as illustrated in FIG. 3. A circumferential groove is provided as at 23 for receiving the adjacent end of the cartridge filter A. An imperforate end plate opposite the exit end of the filter is illustrated in FIG. 3 at 23a. FIG. 4 illustrates the parts as being preferably circular in cross section and in axial alignment.

Referring again more particularly to FIGS. 2 and 3, it will be observed that air is delivered through the sides of the cartridge filter A into the hollow core of the filter from whence the air flow is straightened through the use of the arcuate bellmouth C. It will be observed that an exit of the bellmouth illustrated at 24 is connected adjacent or directly to the entrance end of the arcuate evase D so as to discharge air therein as illustrated at 25. These exit members and entrance members respectively as well as an edge of the orifice plate B defining the exit opening 17 may be welded at their juncture so as to be joined together in sealed relationship. It is significant that no substantial length of ductwork or other components extends between the exit end of the bellmouth and the entrance end of the evase as might result in substantial turbulence which would result in increased pressure drop. It is significant that the evase be longer than the bellmouth. The mounting of FIG. 3 wherein orifice plate B is on the discharge side of the partition could be reversed to locate the orifice plate on the inlet side of the partition.

As illustrated in FIG. 2, a blow down nozzle illustrated at 26 may be utilized to blow back air through the exit cartridge for the purpose of cleaning.

Large air intake systems require a filter to remove particulate matter from the air upon intake or before discharge. The filter must be effective, economical, replaceable or cleanable and offer as low a pressure drop as possible. With large air volumes the fan horsepower presents a major operating cost so low pressure drop filters offer significant cost savings.

Cartridge filters are widely used for this purpose, however, most of these have higher pressure drops than desired resulting in high fan operating cost. Cartridge filters utilize a cylindrical filter media with one imperforate end cap and one open end cap or plate at an exit end. When a negative pressure is applied to the open end plate, air is pulled from the exterior and through the cylindrical filter element, and thence from the interior of the filter through the open end plate at the exit end.

Since the open end plate acts as an orifice, a significant pressure drop occurs as air passes through the open end plate. The majority of the cartridge filter pressure drop occurs in the orifice formed in the open end plate.

It has been found that major reductions in total filter pressure drop can be attained by improving the air flow characteristics of the open end plate. Substantial improvement has been obtained by adding a bellmouth shaped inlet at the end plate utilizing the bell shape inside the filter to direct air and to reduce pressure drop through the open end plate. Additional improvement is achieved by joining an evase to the discharge side of the open end plate to allow a controlled expansion of the air directed thereto by the bellmouth as a result of the increasing cross-sectional area of the evase.

By combining either or both of these elements which the open end plate will greatly reduce the filter pressure drop. The close coupling of these elements has not been used in filter manufacturing before. It may be significant that the parts are joined in close proximity, touching one another, with the bellmouth inlet, the open end plate and the evase. Each of these elements have tapering cross sections, the bellmouth being arcuate and the evase having straight conical sides.

The combination of the bellmouth communicating directly to the evase is more effective than the combining of these components utilizing either a space or sleeve therebetween. By direct coupling turbulence and pressure drop that a space would cause are eliminated. With a space, air would tend to expand between the bellmouth and the evase. Even with a sleeve connection such indirect combination will result in frictional loss due to the sleeve length. The bellmouth would be effective for air entering the filter either through sides or end. The filter surface area is much larger utilizing side entry, and for this reason side entry is preferred. From the following test results, it may be concluded that the utilization of a bellmouth alone substantially reduces the pressure drop across the filter to a far greater extent than would have occurred in fans or other ductwork where the bellmouth would be used conventionly at an entrance end. In such structures utilizing a bellmouth alone approximately a twelve (12%) percent reduction in pressure drop may be expected Test Results:

Compare Pressure Drop of Open End Plate 8.875" I.D.

Original Plate vs. Plate with Full Bellmouth vs. Plate with Bellmouth and Discharge Cone.

| Ctr. Line Vel. FPM | Avg. Vel. FPM | Flow Area Sq. Ft. | Flow CFM CFL | Orig. Pres. Drop in H2° | Bellmouth Pres. Drop in H2° | Bellmouth & Cone Pres. Drop in H2° |
|---|---|---|---|---|---|---|
| 1700 | 1530 | .79 | 1202 | 1.32 | .61 | .14 |
| 1950 | 1755 | .79 | 1378 | 1.70 | .80 | .19 |
| 2150 | 1935 | .79 | 1520 | 1.94 | .95 | .32 |
| 2400 | 2160 | .79 | 1696 | 2.50 | 1.19 | .38 |
| 2620 | 2358 | .79 | 1852 | 3.07 | 1.37 | .49 |

An additional test utilizing an evase only produced the following results.

Open End Plate—8,875" I.D. with Evase Only.

| Ctr. Line Vel. FPM | Avg. Vel. FPM | Flow Area Sq. Ft. | Flow CFM CFM | Inlet Pres. in H2° | Outlet Pres. in H2° | Evase Pres. Drop in H2° |
|---|---|---|---|---|---|---|
| 1700 | 1530 | .79 | 1202 | 1.56 | 2.35 | .79 |
| 1950 | 1755 | .79 | 1378 | 2.10 | 3.19 | 1.09 |
| 2150 | 1935 | .79 | 1520 | 1.43 | 2.71 | 1.28 |
| 2400 | 2160 | .79 | 1696 | 1.86 | 3.44 | 1.58 |
| 2620 | 2358 | .79 | 1852 | 1.67 | 3.87 | 2.20 |

The tests illustrate the fact that even utilizing an evase alone, a greater than expected reduction in pressure drops occur across the filter than would be expected, utilizing the evase alone where even less than 12% improvement would be expected. This is possibly because a fan and the like presents a barrel like member for air flow in contrast to a plate with central round orifice which presents a much more difficult passage for air flow.

These test results taken with the test results first above given, indicate that reductions in individual pressure drops resulted from the combination bellmouth and evase resulting in a reduction in pressure drop greater than would be expected and greater than that attributable to the sum of the two elements. It has been found that the filter media of filters constructed in accordance with the invention has greater capabilities in particle retention during the filtering operation. This is believed to be due to more even air flow across sides of the filter resulting from reduced turbulence and more even distribution of the dust collected.

While a preferred embodiment of the invention has been described using specific terms, such description is for illustrative purposes only, and it is to be understood that changes and variations may be made without departing from the spirit or scope of the following claims.

What is claimed is:

1. An air filter having an exit end positioned opposite an opening in a wall comprising:
a cartridge including an elongated support structure surrounded by filter media wherein air enters laterally through said filter media;
an orifice plate extending across an air exit end of said cartridge having an exit opening for said air;
a bellmouth air entrance member carried within said cartridge on one side of said orifice plate having walls tapering inwardly to an exit end connected to said cartridge adjacent said exit opening in said orifice plate in alignment therewith;
an evase positioned exteriorally of said cartridge on the other side of said orifice plate having walls tapering outwardly from an entrance end connected to said cartridge adjacent said orifice plate in alignment with said exit opening and with said exit end of said bellmouth; and
said exit end of said bellmouth and said entrance end of said evase being aligned and in juxtaposition on respective opposite sides of said orifice plate so that said erase receives air collected by said bellmouth directly from the exit end and discharges same from said cartridge through said evase;
whereby an air pressure drop across said air filter is minimized.

2. The structure set forth in claim 1 wherein said cartridge, said exit opening in said orifice plate, bellmouth and evase are circular in cross-section.

3. The structure set forth in claim 2 wherein said bellmouth is fastened to said evase.

4. The structure set forth in claim 3 wherein said bellmouth and said evase are fixed to said orifice plate in axial alignment therewith.

5. The structure set forth in claim 1 wherein said filter media is a pleated paper cylinder.

6. The structure set forth in claim 1 wherein an end opposite said exit end of said cartridge is closed.

7. The structure set forth in claim 1 wherein said bellmouth has an arcuate surface which is circular in cross-section and said evase has a straight conical surface.

8. The structure set forth in claim 7 wherein said evase is longer than said bellmouth.

9. The structure set forth in claim 1 wherein said elongated support structure includes spaced concentric shells open to air flow therethrough, and pleated paper filter media therebetween.

10. The method of filtering air in an elongated cartridge having an orifice plate extending across an air exit end of said cartridge, a closed end opposite said exit end and a cylindrical filter media covering sides of the cartridge comprising the steps of:
drawing air flow into the sides of said cartridge through said filter media;
passing said air flow into an open end of a bellmouth having inward tapering walls on the cartridge side of the orifice plate and an exit end carried adjacent said orifice plate; and
then introducing said air flow through said orifice plate directly into an entrance end of an erase having outward tapering walls carried exteriorally of the elongated cartridge;
whereby a pressure drop across the cartridge is reduced.

11. The method set forth in claim 10 including the step of:
utilizing a cylindrical pleated paper filter media between spaced cylindrical supports.

12. A fluid filter having an exit end positioned opposite an opening in a wall comprising:
a cartridge including an elongated support structure surrounded by filter media wherein fluid enters laterally through said filter media;
an orifice plate extending across a fluid exit end of said cartridge having an exit opening for said fluid;

a bellmouth fluid entrance member carried within said cartridge having walls tapering inwardly to an exit end connected to said cartridge adjacent and in alignment with said exit opening in said orifice plate;

said exit end of said bellmouth and said exit end of said cartridge being in juxtaposition so that fluid collected by said bellmouth is discharged through said exit end of said cartridge; and an imperforate end plate opposite said fluid exit end; whereby an air pressure drop across said fluid filter is minimized.

13. The structure set forth in claim 12 wherein said cartridge, said exit opening in said orifice plate and bellmouth are circular in cross-section and said filter media is pleated paper forming an air filter.

14. A fluid filter having an exit end positioned opposite an opening in a wall comprising:

a cylindrical cartridge including an elongated support structure surrounded by filter media wherein fluid enters laterally through said filter media;

an orifice plate extending across a fluid exit end of said cartridge having an exit opening for said fluid;

an element of circular cross-section having tapered walls for reducing turbulence having a minimum diameter adjacent said orifice plate connected in aligned relation to said cartridge adjacent said orifice plate opposite said exit opening for reducing the pressure drop at the exit opening;

an entrance end of said element and said exit end of said cartridge being in juxtaposition so that said element receives fluid collected in said cartridge and discharges same from said exit openings and a closure member at an end of said cartridge so that substantially all the fluid passing through said filter enters laterally through said filter media and flows through said exit opening and said tapered walls at said exit end of said filter;

whereby a fluid pressure drop across said fluid filter is minimized.

15. The structure set forth in claim 14 wherein said cartridge, said exit opening in said orifice plate are circular in cross-section and said filter media is pleated paper forming an air filter.

16. The structure set forth in claim 14 wherein said element is a bellmouth fluid entrance member carried within said cartridge adjacent said orifice plate discharging fluid from the exit end of said cartridge.

17. The structure set forth in claim 16 including an evase discharging fluid from the exit end of said cartridge, and wherein said cartridge, said exit opening in said orifice plate, evase, bellmouth, and filter media are arcuate in cross-section and aligned for reducing pressure drop across the filter.

18. The structure set forth in claim 14 wherein said element is an evase carried exteriorly of said cartridge and discharging fluid from the exit end of said cartridge.

* * * * *